Aug. 6, 1968

R. C. DEMI 3,395,887

FUEL FLOW CONTROL VALVE

Filed Aug. 2, 1965

INVENTOR
ROY C. DEMI

BY

*Cauden & Cauden*

HIS ATTORNEYS

Aug. 6, 1968　　　　　R. C. DEMI　　　　　3,395,887
FUEL FLOW CONTROL VALVE
Filed Aug. 2, 1965　　　　　　　　　　　　　　2 Sheets-Sheet 2

INVENTOR
ROY C. DEMI

BY

Cauden & Cauden

HIS ATTORNEYS

United States Patent Office 3,395,887
Patented Aug. 6, 1968

3,395,887
FUEL FLOW CONTROL VALVE
Roy C. Demi, Greensburg, Pa., assignor to Robertshaw Controls Company, Richmond, Va., a corporation of Delaware
Filed Aug. 2, 1965, Ser. No. 476,315
11 Claims. (Cl. 251—234)

ABSTRACT OF THE DISCLOSURE

This disclosure relates to a valve construction having a valve seat member provided with two spaced and offset portions facing in the same direction as the valve seat thereof and respectively sealing against spaced shoulders of a housing member to define a first chamber between the portions of the valve seat member that is interconnected to an inlet of the housing and to define a chamber on the other side of the valve seat member that is interconnected to the outlet, the valve seat member carrying a valve member disposed in the other chamber for opening and closing the valve seat thereof. The distance between the shoulders of the housing is slightly greater than the distance between the portions of the valve seat member so that one of the portions will be placed under compression and flex against its respective shoulder before the other portion seals against its respective shoulder.

---

This invention relates to an improved valve construction for a fuel control system or the like as well as to improved parts for such a valve construction or the like.

The valve construction of this invention is particularly adaptable to be utilized with a fuel control system which controls the operation of a burner means for a domestic oven or the like.

The valve construction of this invention is relatively simple to manufacture and assemble in its particular control device while still performing the necessary functions in the operation of the control device.

Accordingly, it is an object of this invention to provide an improved valve construction having one or more of the novel features of this invention as set forth above or hereinafter shown or described.

Another object of this invention is to provide an improved part for such a valve construction or the like.

Other objects, uses and advantages of this invention are apparent from the reading of this description which proceeds with reference to the accompanying drawings forming a part thereof and wherein.

Figure 1:
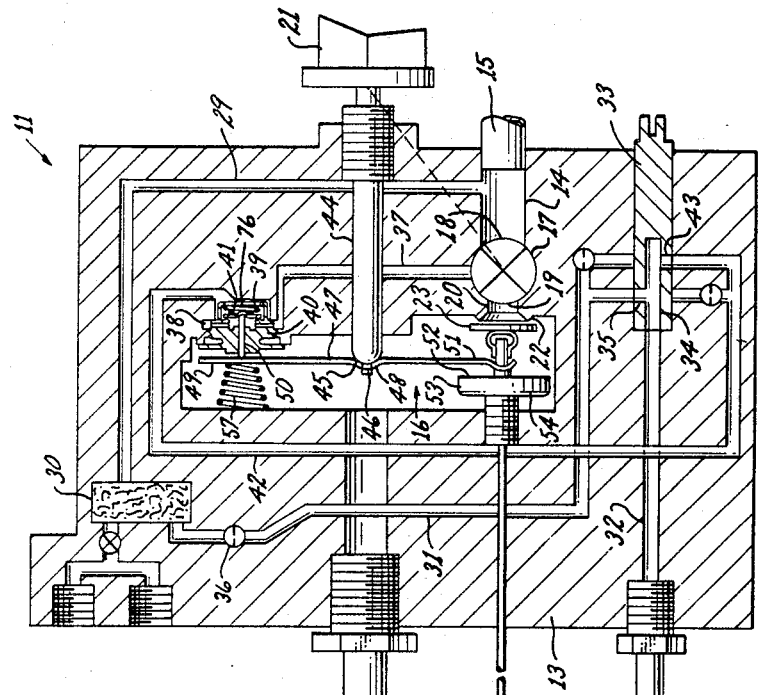
FIGURE 1 is a schematic cross-sectional view illustrating the improved system of this invention.

While the various features of this invention are hereinafter described and illustrated as being particularly adaptable to provide a valve construction for a fuel control device or the like, it is to be understood that the various parts of this invention can be utilized singly or in any combination thereof to provide valve constructions for other devices as desired.

Therefore, this invention is not to be limited to only the embodiment illustrated in the drawings, because the drawings are merely utilized to illustrate one of the wide variety of uses of this invention.

Referring now to FIGURE 1, an improved control system of this invention is generally indicated by the reference numeral 10 and includes a control device 11 for controlling the operation of a main burner means 12 disposed in a suitable oven or the like.

The control device 11 includes a housing means 13 provided with an inlet passage 14 adapted to be interconnected to a fuel supply conduit 15 in any suitable manner, the fuel inlet 14 being separated from a chamber 16 by a disc-shaped valve member 17 which interconnects the inlet part 18 of the passage 14 to an outlet part 19 of a passage means 20 when the valve member 17 is moved to an open position by a control knob 21 in a manner hereinafter set forth.

The passage 20 is interconnected to the chamber 16 by a valve seat 22 adapted to be opened and closed by a valve member 23 in a manner hereinafter set forth.

The chamber 16 is interconnected to a safety valve 24 by a conduit 25, the safety valve 24 having the outlet side thereof interconnected to the burner means 12 by a conduit 26. The safety valve 24 is only adapted to interconnect the conduit 25 with the conduit 26 when a temperature sensing bulb 27 senses that a large heater flame exists at a pilot burner 28. Thus, when no large heater flame exists at the pilot burner 28, the safety valve 24 closes and terminates the flow of fuel to the main burner means 12. However, when the large heater flame again appears at the pilot burner 28 in a manner hereinafter described, the safety valve 24 opens and interconnects the conduit 25 to the conduit 26 whereby fuel issuing from the main burner 12 can be ignited by the flame at the pilot burner 28.

A passage 29 is formed in the housing 13 and leads from the fuel inlet 14 at a point upstream from the disc valve 17 to a filter chamber 30 and, from the filter chamber 30 through a passage means 31 interconnected to a passage 32 by a pilot burner selector key 33, the selector key 33 having a longitudinal bore 34 interconnected to a transverse bore 35 aligned with the passage means 31.

In this manner, even though the disc valve 17 is disposed in a closed position thereof, a small amount of fuel continuously passes through an orifice 36 in the passage means 31 to the pilot burner 28 to produce a small standby flame. However, this small standby flame is not sufficient to heat the bulb 27 to cause opening of the safety valve 24.

When the disc valve 17 is moved to an open position by the control knob 21 to interconnect the side 18 with the side 19, the same also opens a passage 37 to the fuel supply conduit 15 with the passage 37 leading to a chamber 38. The chamber 38 is separated from another chamber 39 by a valve seat member 40 which is opened and closed by a valve member 41 in a manner hereinafter described.

The chamber 38 is interconnected to a passage 42 leading to a transverse bore 43 in the adjusting key 33 whereby when the valve member 41 is opened, and the disc valve 17 is opened, an additional flow of fuel is directed through the passage means 42 to the pilot burner 28 to increase the flow of fuel issuing from the pilot burner 28 to form a heater flame which will be sensed by the bulb 27 to open the safety valve 24 in a manner hereinafter described.

An axially movable fulcrum pin 44 is carried by the housing means 13 and has a rounded end 45 provided with a reduced cylindrical extension 46, the axial position of the fulcrum pin 44 being controlled by the control knob 21 in a manner hereinafter described.

A lever 47 has an intermediate portion 48 thereof fulcrumed on the end 45 of the fulcrum pin 44 whereby one end 49 of the lever 47 is adapted to engage the plunger 50 passing through the valve seat member 40 and engaging the valve member 41, the end 49 of the lever 47 normally being urged in a clockwise direction by a compression spring 57 disposed between the housing means 13 and the end 49 of the lever 47. The other end 51 of the lever 47 bears against a movable wall 52 of an expansible and contractible element 53 having a wall 54 fixed to the housing means 13.

The interior of the expansible and contractible element 53 is interconnected to a temperature sensing bulb 55 disposed in the oven by a conduit means 56. In this manner, the movable wall 52 moves to the right in FIGURE 1 upon an increase in temperature in the oven sensed by the bulb 55 and moves to the left upon a decrease in temperature sensed by the temperature sensing bulb 55 for a purpose hereinafter described.

The movable wall 52 of the expansible and contractible element 53 carries a valve member 23 for opening and closing the valve seat 22 in the manner hereinafter described.

Figure 2:
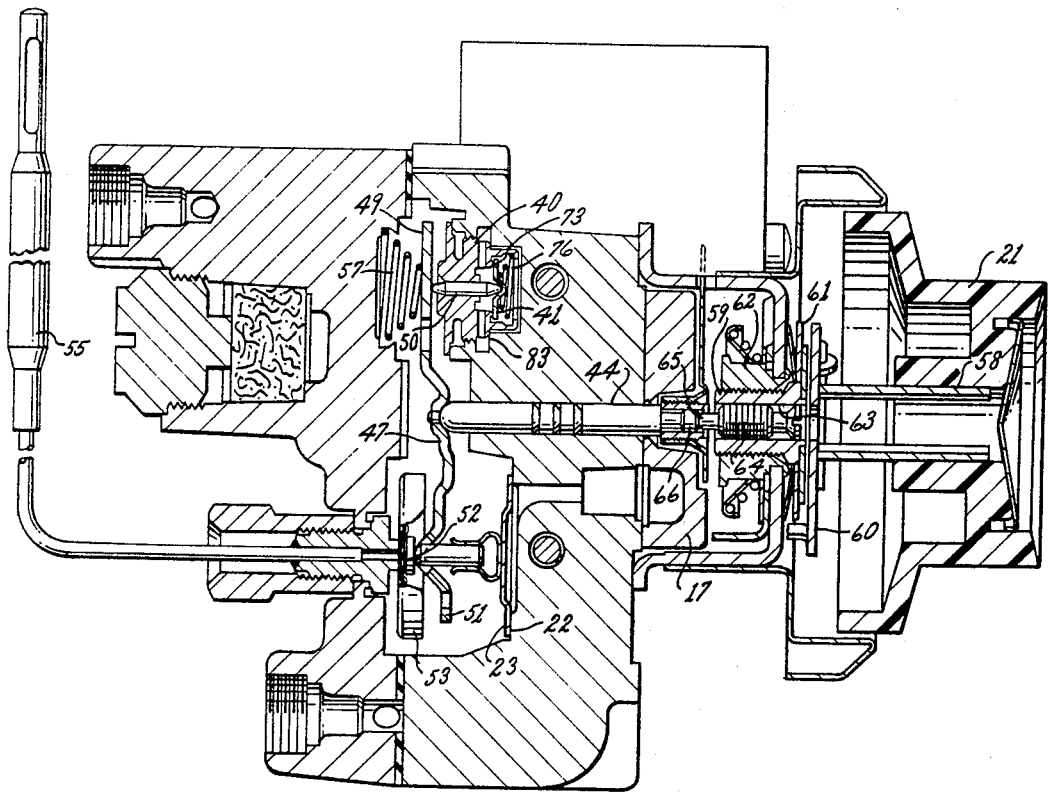
FIGURE 2 is an enlarged, fragmentary, cross-sectional view of the control device of this invention.

As illustrated in FIGURE 2, the control knob 21 is carried on a shaft member 58 interconnected to an externally threaded adjusting member 59 by plate means 60 and 61 whereby rotation of the knob 21 causes simultaneous rotation of the adjusting member 59, the adjusting member 59 being threaded in an internally threaded member 62 carried by the housing means 13. The adjusting member 59 has a threaded bore 63 passing therethrough and threadedly receiving an adjusting screw 64 having an end 65 abutting the other end 66 of the fulcrum pin 44.

The disc valve 17 in FIGURE 2 is operatively interconnected to the control knob 21 by clutch means so that when the control knob 21 is moved from an "off" position thereof to an "on" position, the same rotates the disc valve 17 from an "off" position thereof to an "on" position to interconnect the ports 18 and 19 in FIGURE 1 as well as to interconnect the port 18 to the passage means 37. However, further movement of the control knob 21 to a higher temperature setting does not cause further movement of the disc valve 17 even though the adjusting member 59 is moved relative to the housing 13 to adjust the position of the fulcrum pin 44.

Figure 3:
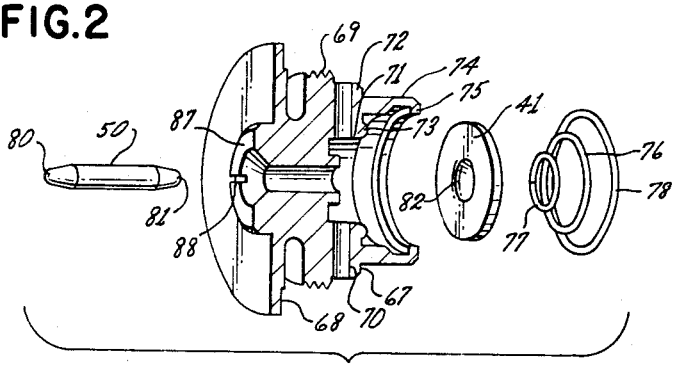
FIGURE 3 is an exploded perspective view of the various parts of the valve construction of FIGURE 2.
Figure 4:
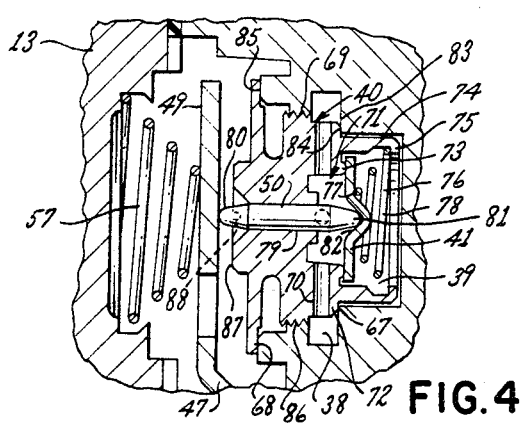
FIGURE 4 is an enlarged, fragmentary, cross-sectional view similar to FIGURE 2 but merely illustrates the valve construction of this invention.

As illustrated in FIGURES 2-4, the valve seat member 40 has a pair of annular shoulders 67 and 68 and an intermediate threaded portion 69. A plurality of passages 70 pass through the valve seat member 40 intermediate the threaded part 69 and the shoulder 67 thereof to interconnect the exterior of the valve seat member 40 with a recess 71 interrupting the end 72 of the valve seat member 40, the valve seat member 40 having an annular projecting valve seat 73 surrounding the recess 71 thereof to be opened and closed by the valve member 41.

A hollow tubular extension 74 extends from the end 72 of the valve seat member 40 and terminates in an inwardly directed annular flange 75 whereby the valve member 41 is adapted to be disposed in the tubular extension 74 and a compression spring 76 is adapted to be disposed therein with one end 77 bearing against the valve member 41 and the other end 78 bearing against the annular flange 75 to tend to normally maintain the valve member 41 against the valve seat 73.

A longitudinal bore 79 passes through the valve seat member 40 to telescopically receive the plunger or pin 50 whereby one end 80 of the pin 50 is adapted to be engaged by the end 49 of the lever 47 and the other end 81 of the pin 50 is adapted to be received in a recess 82 in the valve member 41.

The housing 13 has a stepped bore 83 provided therein and defining a pair of annular shoulders 84 and 85 with an intermediate internally threaded portion 86. The distance between the shoulders 84 and 85 is slightly greater than the normal distance between the shoulders 67 and 68 of the valve seat member 40 so that when the valve seat member 40 has the valve member 41 and spring 76 assembled thereto and is inserted in the stepped bore 83, the threaded part 69 of the valve seat member 40 is threaded into the threaded part 86 of the housing 13 whereby the shoulder 68 of the valve seat member 40 can be compressed against the shoulder 85 of the housing 13 and with further tightening of the valve seat member 40 the shoulder 67 thereof can be tightened against the shoulder 84 whereby the chamber 38 is defined between the shoulders 84 and 85 and is completely separate from the main chamber 16 and from the chamber 39 defined between the shoulder 84 and the remainder of the bore 83.

If desired, when the valve seat member 40 is threaded in the stepped bore 83 of the housing 13, a suitable sealing compound can be placed on the shoulders 67, 68 and/or shoulders 84 and 85 to effect a more positive seal therebetween, the tubular extension 74 of the valve seat member serving as a guard to prevent the sealing compound from reaching and clogging the valve member 41. The end 87 of the valve seat number 40 can be provided with a slot 88 to permit the same to receive a screwdriver or the like to thread the valve seat member 30 into the bore 83 of the housing 13.

Thus, it can be seen that the valve member 41 is adapted to interconnect the chambers 38 and 39 together when the valve seat member 41 is moved away from the valve seat 73 in a manner hereinafter described and to prevent fluid communication between the chambers 38 and 39 when the valve member 41 is placed against the valve seat 73 in a manner hereinafter described.

Further, because the valve seat member 40 can have the valve member 41 and compression spring 76 assembled thereto as to a subassembly, the entire assembly 40, 41 and 76 can be inserted in a single operation into the housing 13 of this invention in a simple and effective manner to provide the valve construction of this invention.

Thus, since the distance between the shoulders 84 and 85 on the housing 13 is greater than the normal distance between the shoulders 67 and 68 on the valve seat member 40, when the valve seat member 40 is threaded in the bore 83 of the housing 13, the shoulder 68 makes contact with the shoulder 85 before the shoulder 67 makes contact with the shoulder 84. Thus, further threading of the valve seat member 40 in the bore 83 causes the shoulder 68 to bend until the shoulder 67 is placed into sealing contact with the shoulder 84 of the housing 13 whereby a fluid seal is created between the chambers 38 and 39 for a purpose hereinafter described.

Figure 5:
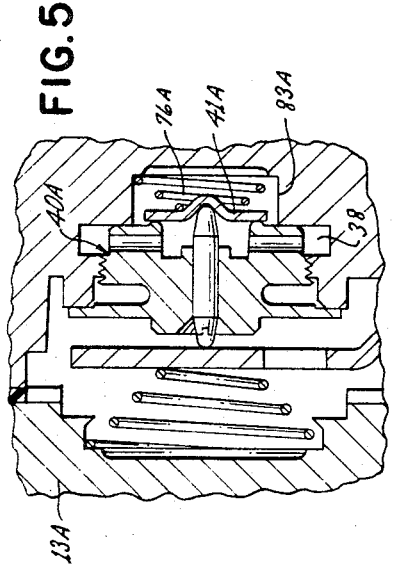
FIGURE 5 is a view similar to FIGURE 4 and illustrates another embodiment of this invention.

While the valve seat member 40 of this invention has been previously described and illustrated as having the tubular extension 74 to provide a means for mounting the valve member 41 and compression spring 76, it is to be understood that the tubular extension 74 could be eliminated to provide a valve seat member 40A as illustrated in FIGURE 5 wherein the valve member 41A and compression spring 76A must be first assembled into the bore 83A of the housing 13A before the valve seat member 40A is threaded therein, the valve seat member 40A performing the same function as the valve seat member 40 previously described.

The operation of the system 10 and the control device 11 of this invention will now be described.

When the system 10 is installed in a domestic appliance for a consumer's home, the adjusting key 33 is adjusted from an "off" position thereof to the position illustrated in FIGURE 1 whereby even though the control knob 21 is disposed in its "off" position, a minimum amount of fuel flows through the passage means 31 to the pilot burner 28 to produce a small standby flame which will continuously burn and will not affect the safety valve 24 which remains in its closed position.

When the operator desires to turn on the control device 11, the control knob 21 is rotated in the proper direction from the "off" position thereof whereby the disc valve 17 is moved from the closed position thereof to the open position thereof to interconnect the inlet 18 with the outlet 19 as well as to the passage means 37 whereby fuel is adapted to flow from the manifold 15 to the chamber 38 and to the chamber 16.

Rotational movement of the control knob 21 from the "off" position to a particular setting position causes the adjusting member 59 to be moved to the right in FIGURE 2 to permit the fulcrum pin 44 to move to the right therewith under the force of the compression spring 57 whereby the lever 47 is disposed in a set position thereof.

Since the temperature of the oven is below the temperature set by the control knob 21 and, thus, by the fulcrum pin 44, the movable wall 52 of the power element 53 is disposed in such a position to the left in FIGURE 2 that the valve member 23 is disposed in an open position and the force of the compression spring 57 has pivoted the end 49 of the lever 47 to the right to move the plunger 50 and open the valve member 41 away from the valve seat 73 so that fuel in the chamber 38 can now flow to the chamber 39 and by means of the passage 42 to the pilot burner 28 to produce a large heater flame. The heater flame at the pilot burner 28 is sensed by the bulb 27 which causes the safety valve 24 to open so that fuel in the chamber 16 of the housing 13 can now be directed to the burner means 12 and be ignited by the pilot burner 28.

Thus, as long as the temperature of the oven is below the selected temperature, the valve member 41 is opened so that fuel can issue from the main burner 12 to heat the oven.

However, when the temperature of the oven reaches the selected temperature, the movable wall 52 of the power element 53 has moved to the right in FIGURE 2 a distance sufficient to cause the lever 47 to pivot to the position illustrated in FIGURE 2 so that the valve member 41 will seat against the valve seat 73 and prevent the additional flow of fuel to the pilot burner 28. Thus, the large heater flame at the pilot burner 28 is terminated even though a small standby flame still remains. In this manner, the temperature bulb 27 of the safety valve 24 senses that a heater flame no longer exists at pilot burner 28 and, thus, closes the safety valve 24 to prevent the flow of fuel to the main burner means 12.

Thus, when the temperature of the oven again falls below the selected temperature, the lever 47 is pivoted in such a manner that the same opens the valve member 41 so that the heater flame can again exist at the pilot burner 28 to open the safety valve 24 to operate the main burner 12.

In this manner, the main burner 12 is cycled on and off by means of the valve member 41 to maintain the temperature of the oven at the selected temperature.

The valve member 23 merely acts as a high limit valve so that if during the operation of the oven in the above manner, the small valve 41 should remain open through malfunction or the like, whereby a runaway condition could exist in the oven, the movable wall 52 of the expansible element 53 moves to the right in FIGURE 2 a distance sufficient to cause the valve 23 to approach the valve seat 22 whereby the same throttles the flow of fuel to the burner means 12 so that the burner means 12 can not produce a temperature in the oven above a safe limit thereof.

When it is desired to turn off the oven, the operator rotates the knob 21 back to its "off" position whereby not only is the fulcrum pin 44 axially moved to the left in FIGURE 2, but also the control knob 21 is again interconnected by the clutch means to the disc valve 17 to move the same to the "off" position whereby the supply conduit 15 is disconnected from the passage means 37 and the chamber 16 so that no fuel can pass to the main burner means 12. In addition, the fulcrum pin 44 is moved to an axial position such that regardless of the temperature of the oven, the lever 47 will maintain the valve member 41 in its closed position.

Therefore, it can be seen that this invention not only provides an improved valve construction having many novel features, but also this invention provides improved parts for such a valve construction or the like.

While the form of the invention now preferred has been disclosed as required by the statutes, other forms may be used, all coming within the scope of the claims which follow.

What is claimed is:

1. In combination, a housing having an inlet and an outlet and a pair of spaced shoulders, a valve seat member disposed between said inlet and said outlet, said valve seat member having two spaced portions sealed against said housing respectively at said shoulders thereof to define two chambers therewith and respectively interconnected to said inlet and said outlet, said valve seat member being fastened to said housing by an interconnection between said valve seat member and said housing, said valve seat member having passage means for interconnecting said two chambers together, and a valve member for opening and closing said passage means, said valve seat member normally having a distance between said two portions less than the distance between said pair of shoulders of said housing whereby said interconnection between said housing and said valve seat member causes one of said portions of said valve seat member to engage against its respective shoulder and flex so as to be under compression before the other portion engages against its respective shoulder.

2. A combination as set forth in claim 1 wherein an axially movable plunger is carried by said valve seat member and is operatively interconnected to said valve member.

3. A combination as set forth in claim 2 wherein a lever is carried by said housing and operates said plunger.

4. A combination as set forth in claim 3 wherein a thermostat operates said lever.

5. A combination as set forth in claim 4 wherein said housing carries means to adjust the position of said lever.

6. A combination as set forth in claim 1 wherein said valve seat member is an integral member.

7. A combination as set forth in claim 1 wherein said housing has a threaded bore interconnecting said inlet to said outlet, said valve seat member having a threaded part threaded into said bore to define said interconnection between said valve seat member and said housing.

8. A combination as set forth in claim 1 wherein a spring means urges said valve member to a closed position.

9. A combination as set forth in claim 8 wherein said valve seat member carries said spring and valve member.

10. A combination as set forth in claim 1 wherein said threaded part is disposed between said two portions of said valve seat member.

11. A combination as set forth in claim 1 wherein said valve seat member has a hollow tubular extension provided with an inwardly directed flange, said valve member being disposed in said tubular extension, and a compression spring disposed between said valve member and said flange to tend to urge said valve to a closed position.

References Cited

UNITED STATES PATENTS

| | | | |
|---|---|---|---|
| 1,562,979 | 11/1925 | Muend | 137—454.5 |
| 2,724,409 | 11/1955 | Coffey | 137—628 |
| 3,279,746 | 10/1966 | Arnold | 251—214 |

WILLIAM F. O'DEA, *Primary Examiner.*

D. R. MATTHEWS, *Assistant Examiner.*